US009255393B2

(12) United States Patent
Trauth

(10) Patent No.: US 9,255,393 B2
(45) Date of Patent: Feb. 9, 2016

(54) STORM WATER REDISTRIBUTION DEVICE

(71) Applicant: Kathleen M Trauth, Columbia, MO (US)

(72) Inventor: Kathleen M Trauth, Columbia, MO (US)

(*) Notice: Subject to any disclaimer, the term of this patent is extended or adjusted under 35 U.S.C. 154(b) by 108 days.

(21) Appl. No.: 14/159,197

(22) Filed: Jan. 20, 2014

(65) Prior Publication Data

US 2014/0202564 A1 Jul. 24, 2014

Related U.S. Application Data

(60) Provisional application No. 61/849,206, filed on Jan. 22, 2013.

(51) Int. Cl.
*E03B 1/00* (2006.01)
*E03F 1/00* (2006.01)

(52) U.S. Cl.
CPC . *E03F 1/002* (2013.01); *E03B 1/00* (2013.01); *Y10T 137/85938* (2015.04)

(58) Field of Classification Search
USPC .......................................... 405/36; 137/561 A
See application file for complete search history.

(56) References Cited

U.S. PATENT DOCUMENTS

| 2,201,279 | A | * | 5/1940 | Willing | 405/16 |
| 5,152,632 | A | * | 10/1992 | Hawkes | 404/20 |
| 5,511,904 | A | * | 4/1996 | Van Egmond | 405/52 |
| 5,595,458 | A | * | 1/1997 | Grabhorn | 405/302.6 |
| 5,750,026 | A | * | 5/1998 | Gadkaree et al. | 210/502.1 |
| 5,948,250 | A | * | 9/1999 | Middleton | C02F 1/40 |
| | | | | | 210/232 |
| 5,951,202 | A | * | 9/1999 | Brown | 405/19 |
| 6,368,017 | B2 | * | 4/2002 | Black | 405/15 |
| 7,056,057 | B2 | | 6/2006 | Marchant | |
| 7,226,240 | B2 | | 6/2007 | Tyler | |
| 7,449,105 | B2 | * | 11/2008 | Hastings | E02D 29/0291 |
| | | | | | 210/170.03 |
| 2001/0007309 | A1 | * | 7/2001 | Malone et al. | 210/170 |
| 2002/0155237 | A1 | * | 10/2002 | Allard | 428/36.1 |
| 2004/0005198 | A1 | * | 1/2004 | Spangler | E02B 3/04 |
| | | | | | 405/302.6 |
| 2007/0253785 | A1 | * | 11/2007 | Tyler | 405/302.6 |
| 2012/0230766 | A1 | * | 9/2012 | Schnaars, Sr. | E02D 29/0291 |
| | | | | | 405/32 |

* cited by examiner

*Primary Examiner* — Benjamin Fiorello
*Assistant Examiner* — Kyle Armstrong
(74) *Attorney, Agent, or Firm* — Erickson Kernell Derusseau & Kleypas, LLC

(57) ABSTRACT

A storm-water redistribution device and installation are described for providing headloss and redistribution of a flow of storm-water runoff. The device includes an elongate, tubular, geotextile enclosure having a plurality of transverse partitions therein that form a plurality of segments along the length of the device. Each segment is filled with a particulate material, such as gravel having a desired grade size or distribution thereof. Longitudinal partitions are provided to form one or more transversely positioned compartments. The device is installed perpendicular to a slope to intercept runoff flows. The flow infiltrates the device and is diverted into vertical infiltrating flow, longitudinal flow that distributes the flow along the device length, and transverse flow that exits the opposite side of the device as overland or subsurface flow of reduced velocity. The partitions enable retention of the particulate materials in desired positions within the device during manipulation and use.

20 Claims, 6 Drawing Sheets

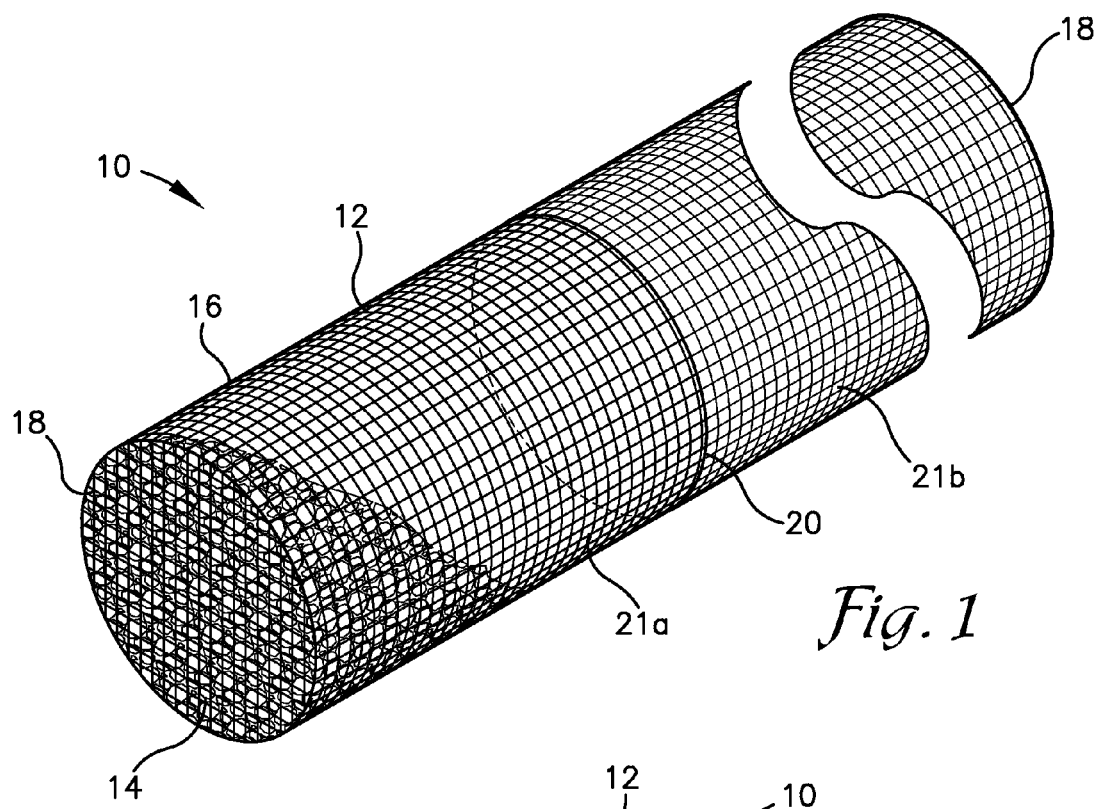
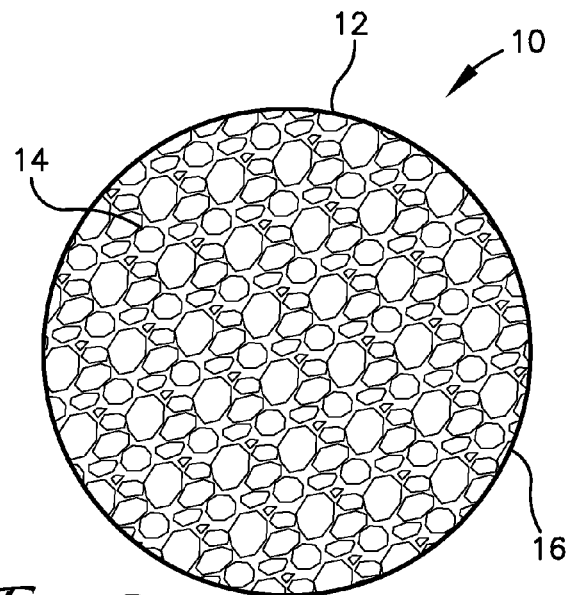

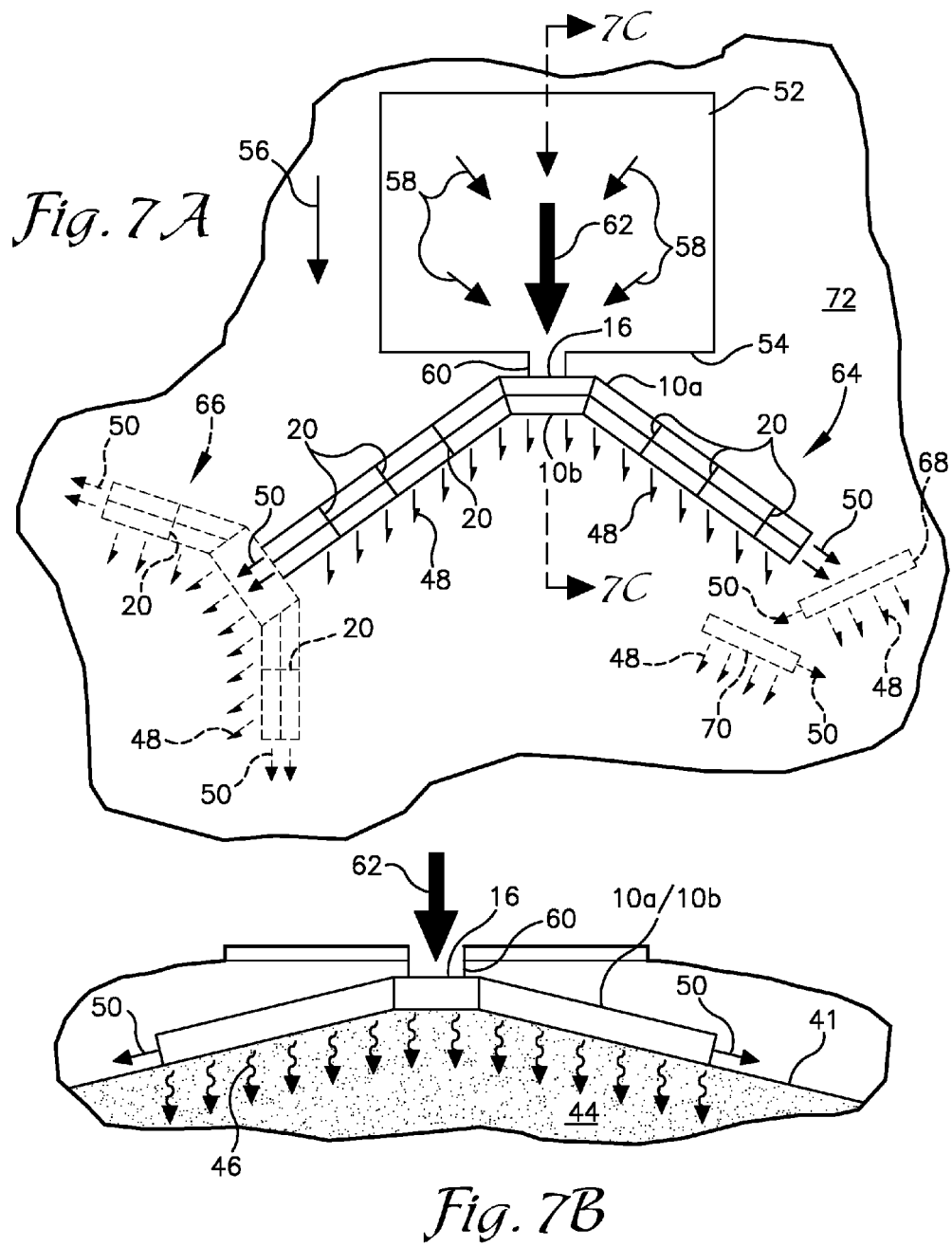

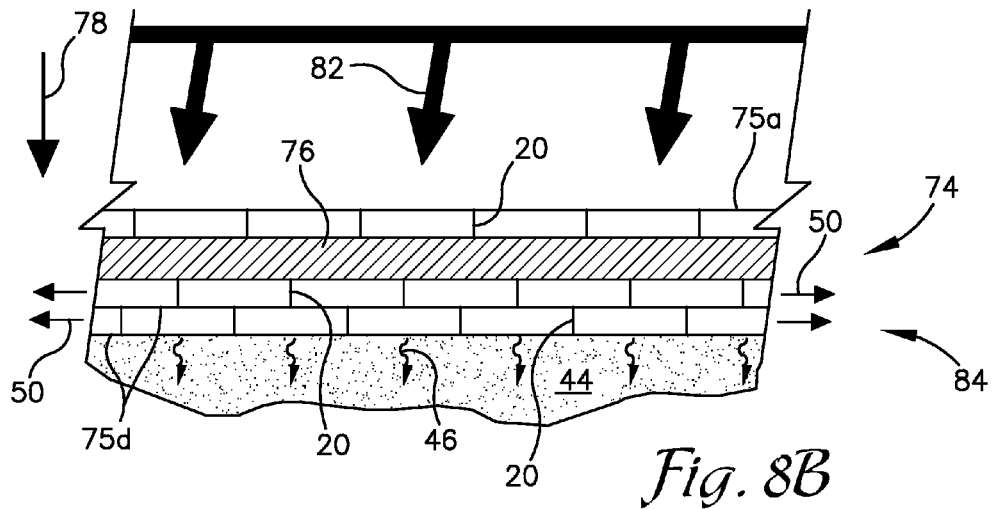
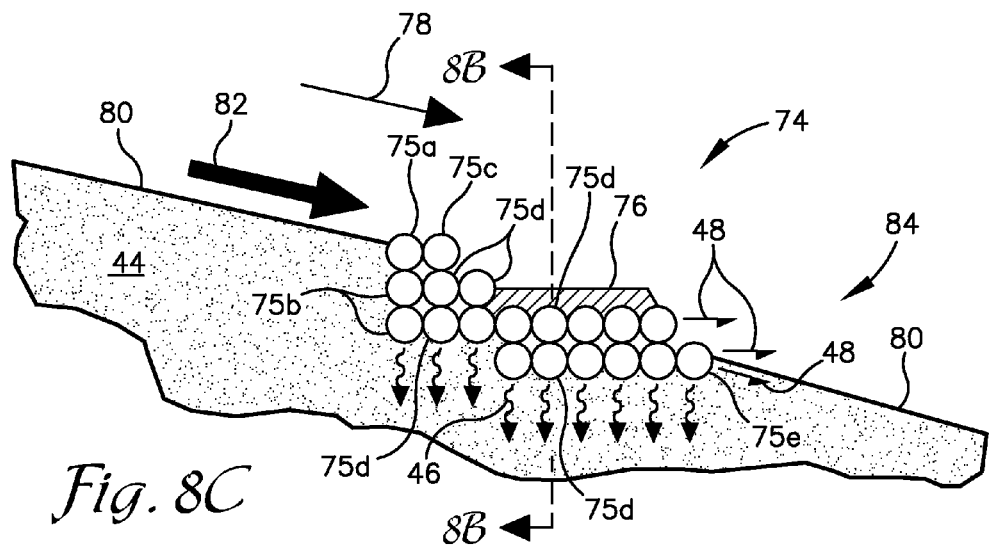

STORM WATER REDISTRIBUTION DEVICE

CROSS-REFERENCE TO RELATED APPLICATIONS

This application claims priority to U.S. Provisional Patent Application No. 61/849,206, filed Jan. 22, 2013, the disclosure of which is hereby incorporated herein in its entirety by reference.

BACKGROUND

As various parcels of land are developed to create residential neighborhoods, shopping centers, and the like, pervious land covers like vegetation and undisturbed soil are replaced with impervious land covers, such as pavement and rooftops. These impervious surfaces prevent the natural infiltration of precipitation and result in increased storm water runoff. As storm water runoff flows off of a developed location and ultimately to a stream or other body of water, it can physically cause erosion and move soil particles, as well as dissolve and transport chemicals from the land surface to the body of water.

The U.S. Environmental Protection Agency (EPA) and state departments of natural resources/environmental protection are concerned with nonpoint source (NPS) pollution. NPS pollution is that component of water pollution that comes from the transport of materials on the land surface to a receiving stream via storm water runoff. With NPS pollution, there may be multiple pollutants that come from multiple surface locations under the jurisdiction of multiple landowners. One of these NPS pollutants is sediment. Sediment can be generated from the land surface over which the storm water runoff travels as well as from the bed of the stream channel through which the water is transported. Nonpoint source pollutants are responsible for many stream segments not meeting their water quality criteria.

The EPA now requires post-construction controls under its National Pollutant Discharge Elimination System (NPDES) Phase II storm water requirements. Post-construction controls, as incorporated into municipal ordinances and frequently called best management practices (BMPs), often require the location of buffer strips or stream buffers between the development and the stream in an effort to slow down and allow infiltration of the runoff before it reaches the stream, in addition to allowing sediment to drop out. The mechanism for this reduction in velocity is the hydraulic roughness of the vegetative cover of the buffer as the water travels in the form of overland flow. However, the storm water runoff from a development, even as small as a parking lot, often exits the development at a single concentrated location. There is thus no opportunity to take advantage of the benefits of overland flow and the resulting infiltration.

Stream buffers are among the very popular BMPs. With a stream buffer, a strip of land along a stream is precluded from development. With development, there are two major impacts. The first impact is the generation of additional volume of storm water runoff because of the increase in impervious surfaces. The second impact is the increase in NPS pollutants (e.g., sediment, nutrients, petroleum products, heavy metals) that results from the activities associated with development. The role of stream buffers is to slow the velocity of flow in order to physically allow solid materials to settle out and to increase storm water infiltration. Infiltration into the subsurface promotes "treatment" within the soil matrix. Infiltration results in less water arriving at the stream from the surface and reduces the potential for stream erosion with its many subsequent problems.

The expected performance of a buffer is associated with the expected condition of overland flow—slow, shallow flow that occurs over a large surface area. As overland flow progresses from higher to lower locations, the natural topography helps to concentrate flow into larger and larger channels with subsequent increases in velocity. The result of the concentration is the reduction in sedimentation and infiltration and the production of gullies downstream of any kind of storm water discharge location.

In order to make the requirement for buffers more acceptable, EPA documents tout buffers as linear parks, within the continuum from wooded areas adjacent to a stream through a brushy section, and linking to the grassed areas often associated with developed land. These natural areas could potentially increase property values and make up for the lost development areas. A linear park might be provided with walking paths, or such paths might develop organically from use by landowners and neighbors. Unfortunately, paths would exacerbate the natural process of flow concentration that short circuits the performance of the buffers.

What is needed, then, is a mechanism to return concentrated storm water runoff to the distributed overland flow condition to promote sedimentation and infiltration in compliance with EPA requirements and intentions. Increased sedimentation and infiltration will improve the effectiveness of buffers, even as paths help to make buffers more publically acceptable. Effective storm water management also prevents the destructive and costly impacts of gully and stream bank erosion, both of which can undermine expensive infrastructure. To accomplish this redistribution, a device is needed that introduces enough headloss to slow down the water and then allows it to spread out.

Current practice for managing concentrated flow, as from a parking lot, is to line the initial portion of the receiving vegetated channels with riprap or related products. The roughness of the riprap induces headlosses and armors the drainage channel to reduce erosion as the water travels to a stream, but does not serve to promote infiltration or sediment settling. Much opportunity remains for storm water management devices in order to service these regulatory drivers, even as the requirements become more stringent and more broadly applicable.

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes, among other things, a stormwater redistribution device and methods for producing headloss in and redistribution of storm-water runoff and other fluid flows.

The storm-water redistribution device comprises a generally tubular, porous enclosure having one or more particulate media disposed therein. The device is configured to intercept an originating fluid flow, produce headloss in the flow, and to redirect or redistribute the flow into one or more subsequent flow types including: Type 1 or vertical flow, comprising infiltration of the fluid into the subsurface; Type 2 or transverse flow, comprising overland or infiltrating flow of the fluid transverse to the length of the device; and Type 3 or longitudinal flow, comprising flow through the device and parallel to the length of the device. The headloss and redirection of the originating flow provided by the device reduces the velocity of the flow to increase subsurface infiltration of the resulting flows. Thereby, upon exiting the device, the ability of the fluid to retain and carry contaminants is diminished and the filtration of the fluid by the subsoil is increased.

The enclosure is preferably formed from a geotextile fabric comprised of a flexible mesh, netting, or other fluid-permeable material configured to enable infiltration of fluids into the device. The enclosure includes a generally elongate, tubular form and may include one or more transverse or longitudinal partitions therein. The partitions are configured to retain the particulate media within a particular location within the enclosure.

The particulate media comprise one or more aggregates, pebbles, rocks, sand, fibers, or other particulate materials. The particulate media is graded to provide a particular size or range of sizes and surface characteristics configured to produce a desired flow of fluid through respective regions of the device.

The storm-water redistribution device is installed across a path of the originating flow of storm water such that the originating flow is obstructed by contact with a sidewall of the device. The originating flow infiltrates into the device through the fluid-permeable enclosure to contact the media disposed therein. Flow through the device is obstructed by the media which is configured and located to slow the velocity of the flow and to divert the fluid in one or more directions. A portion of the fluid is diverted generally vertically downward to exit the device and infiltrate into the subsurface. A second portion of the fluid passes through the device to exit an opposite sidewall as overland flow but at a reduced velocity or as subsurface infiltrate. A third portion of the fluid is directed along the length of the device toward an end thereof. The third portion can exit an end of the device as overland flow or as subsurface infiltrate having a reduced velocity, or the third portion can be transferred to a subsequent storm-water redistribution device to provide further headloss and redistribution as necessary.

DESCRIPTION OF THE DRAWINGS

Illustrative embodiments of the invention are described in detail below with reference to the attached drawing figures, and wherein:

FIG. 1 is a perspective view of a storm-water redistribution device depicted in accordance with an embodiment of the invention;

FIG. 2 is a cross-sectional, end elevational view of a storm-water redistribution device depicted in accordance with an embodiment of the invention;

FIG. 7A is a schematic top plan view of an installation of storm-water redistribution devices for control of runoff from a parking lot depicted in accordance with an embodiment of the invention;

FIG. 7B is a schematic front elevational view of the installation of storm-water redistribution devices of FIG. 7A;

FIG. 8B is a sectional, elevational view of the installation of storm-water redistribution devices of FIG. 8A taken along the line 8B-8B depicted in FIG. 8C; and FIG. 8C is a cross-sectional, end elevational view of the installation of storm-water redistribution devices of FIG. 8A taken along the line 8C-8C.

DETAILED DESCRIPTION

Figures 3, 4:
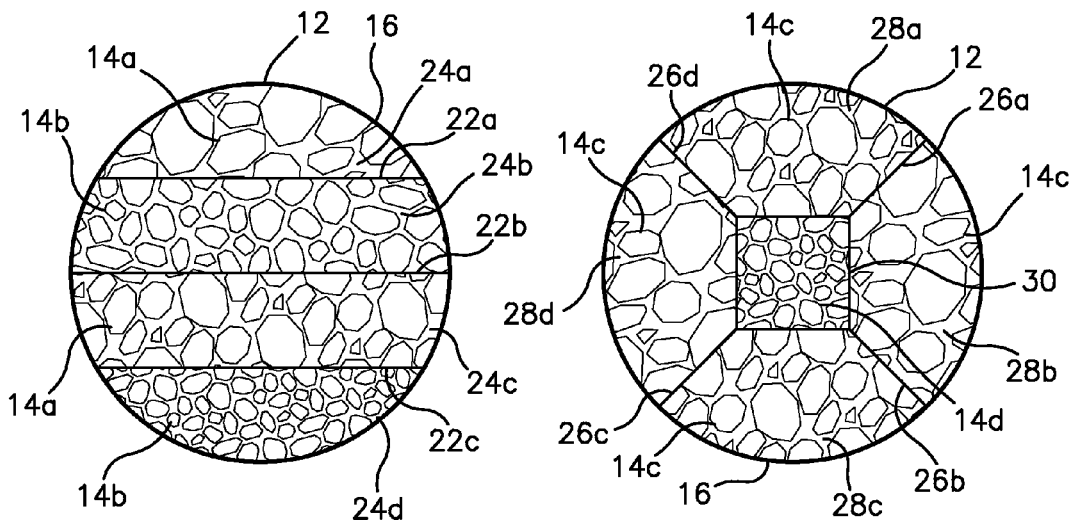
FIG. 3 is a cross-sectional, end elevational view of another storm-water redistribution device having a plurality of layered longitudinal partitions disposed therein and depicted in accordance with an embodiment of the invention.
FIG. 4 is a cross-sectional, end elevational view of a storm-water redistribution device having a plurality of longitudinal partitions forming compartments within the device depicted in accordance with an embodiment of the invention.

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

Embodiments of the invention are described herein with respect to applications associated with storm-water runoff, however such is not intended to limit embodiments of the invention. Embodiments might also be employed for producing headloss and/or redistribution of non-storm-water related fluid flows like, for example, and not limitation, commercial chemical or fluid spills or discharges, residential drainage applications, creeks, rivers, and pond or lake runoff, among others.

With reference now to FIGS. 1 and 2, a storm-water redistribution device 10 is described in accordance with an embodiment of the invention. The device 10 comprises an elongate, generally tubular enclosure 12 with a volume of one or more particulate materials 14 disposed therein. The enclosure 12 is preferably comprised of a generally flexible, geotextile or geosynthetic fabric. The fabric can be a mesh, netting, felt, or other material formed from one or more plastics, polyesters, polypropylenes, polyethylenes, rayons, nylons, cotton, or the like that are woven, sewn, knitted, extruded, needle punched, perforated, or heat bonded, among others. The construction of the fabric provides pathways through which fluids can permeate through the fabric. The fabric is configured with sufficient fluid-permeability to enable a desired level of infiltration of fluid, e.g. storm water, through the fabric and into the device 10. The permeability of the fabric may be configured to restrict passage of particulate materials carried by the fluid through the fabric. Preferably, the enclosure fabric at least partially filters contaminant particles suspended in the fluid to decrease sedimentation of the contaminants within the device 10. The enclosure 12 includes an annular sidewall 16 with a transverse end wall 18 disposed at each end thereof. As depicted in FIGS. 1 and 2, the enclosure 12 has a generally circular cross-sectional shape, but the enclosure 12 may take other forms, such as, ovate, polygonal, or curvilinear. The end walls 18 span across the open ends formed by the sidewalls 16 to fully enclose the interior of the enclosure 12. The end walls 18 can be coupled to the sidewall 16 by one or more of sewing, welding, gluing, or the like. In an embodiment, one or more of the end walls 18 are not provided, and the sidewall 16 is gathered or folded toward the central longitudinal axis of the enclosure 12 and secured in place to enclose the end of the enclosure 12.

The enclosure 12 can be constructed to provide the device 10 with any desired dimensions, but preferably has a length that is substantially greater than its width. In an embodiment, the device 10 has a length between approximately 5 and 100 feet and a transverse width of approximately 6 to 18 inches or preferably has a length of approximately 10 feet and a diametrical width of approximately 12 inches. The device 10 may be provided with dimensions that enable ease of handling, transport, and installation which may be completed manually or using construction equipment including loaders, lifts, and the like.

The enclosure 12 may include one or more transverse partitions 20 disposed therein. FIG. 1 depicts a transverse partition 20 disposed interior to the enclosure 12 and dividing the interior of the enclosure 12 into separate segments 21a, 21b. The transverse partitions 20 divide the interior of the enclosure 12 into a plurality of segments 21 of equal length or volume, or the transverse partitions 20 may divide the interior into a plurality of segments 21 of varied length or volume.

With additional reference to FIGS. 3 and 4, one or more longitudinal partitions 22 might be provided. FIG. 3 shows longitudinal partitions 22a, 22b, 22c extending between opposite sides of the sidewall 16 and along the length of the enclosure 12 to divide the interior of the enclosure 12 into a plurality of stratified compartments 24a, 24b, 24c, 24d. As depicted in FIG. 3, the longitudinal partitions 22a-c are generally planar and extend horizontally across the enclosure 12, however the partitions 22 can be placed in any desired orientation and can be planar, angular, or curvilinear. The compartments 24 can be formed in any desired size, shape, and orientation by the partitions 22. The longitudinal partitions 22 may also be configured to intersect and/or form additional compartments 24 within the enclosure 12. For example, as depicted in FIG. 4, longitudinal partitions 26a-d are generally aligned along radii of the sidewall 16 and form a plurality of wedge-shaped compartments 28a-d. The partitions 26a-d also intersect and/or form a central compartment 30 within the interior of the enclosure 12.

The transverse and longitudinal partitions 20, 22, 26 are formed from the same geotextile material that comprises the sidewall 16 and end walls 18 of the enclosure 12. Or the partitions 20, 22, 26 can be formed from one or more different materials having different material properties, e.g. fluid-permeability. Further, each of the partitions 20, 22, 26 in a particular embodiment may be individually tailored to provide characteristics specific to each partition 20, 22, 26. For example, as depicted in FIG. 3, the partition 24a might have greater fluid-permeability than the partition 24b so as to enable greater vertical flow of fluid from the upper compartment 24a to the next lower compartment 24b while also promoting greater longitudinal flow within the compartment 24b.

The partitions 20, 22, 26 aid to retain the particulate materials 14 within the respective segments 21 or compartments 24, 28, 30. As such, the particulate materials 14 can be selectively positioned within the enclosure 12 to promote desired flow, headloss, or other characteristics. And the particulate materials 14 cannot be dislodged or relocated within the device 10 by the flow of fluid therethrough or by gravity acting on the device 10 when placed on a slope.

The particulate materials 14 preferably comprise one or more gravels, pebbles, aggregates, sands, plastics, or the like. The particulate materials 14 may be graded by average particle size to provide a volume of the material 14 in a respective segment 21 of a single particle size (uniformly graded) or one or more ranges of sizes (well graded or gap graded).

The device 10 is configured for permanent or long-term installation and thus the particulate materials 14 are preferably non-organic materials that will not readily degrade or decompose. In another embodiment, the device 10 can be configured for short-term use and may include decomposable or organic materials like wood shavings, wood pellets, clay, peat, rice hulls, compost, and waste materials, among others. Activated carbon, flocculants, chemical binders, and other materials configured to collect, react with, bind, or precipitate contaminates from the fluid can also be used. Organic, decomposable, and chemically active materials may cause sedimentation or precipitation of particles within the enclosure 12 which may shorten the useable lifespan of the device 10.

The type and/or grade or grades of the particulate material 14 are selected to provide a desired headloss in a fluid flowing through a volume of the material 14 within the device. Characteristics, such as surface texture, e.g. smooth, rough, or porous, and overall shape are also selectable to tailor the headloss and flow diversion provided by the material 14. The material characteristics and/or orientation of the particles thereof within the device 10 are further selectable to aid diversion of the fluid flow in desired directions. For example, elongate particles might be chosen and aligned lengthwise with the length of the device to induce type 3 fluid flow parallel to the length of the device.

Each of the segments 21 and compartments 24, 28, 30 can be filled with a single type and grade of particulate materials 14, or the materials 14 can be selectively tailored to the flow and headloss characteristics desired in each of the segments 21 and compartments 24, 28, 30. For example, as depicted in FIG. 3, a larger, uniformly graded material 14a might be disposed in compartments 24a and 24c to provide a low level of headloss to a fluid flow and to divert the fluid flow downward into compartment 24b and 24d, respectively, that include a smaller, well graded material 14b that provides a greater level of headloss to the fluid. Or, as depicted in FIG. 4, a well graded material 14c might be disposed in compartments 28a to provide sufficient headloss and filtration of a fluid flow while a larger, uniformly graded material 14d is disposed in the central compartment 30 to enable greater flow of the fluid parallel to the length of the device 10 for redistribution of the fluid therealong. Although exemplary configurations of the materials 14 and compartments 24, 28, 30 are depicted and described herein, such is not intended to limit embodiments of the invention. Any of a variety of possible combinations and configurations of the materials 14 and compartments 24, 28, 30 may be employed in embodiments of the invention without departing from the scope described herein.

Figure 5A:
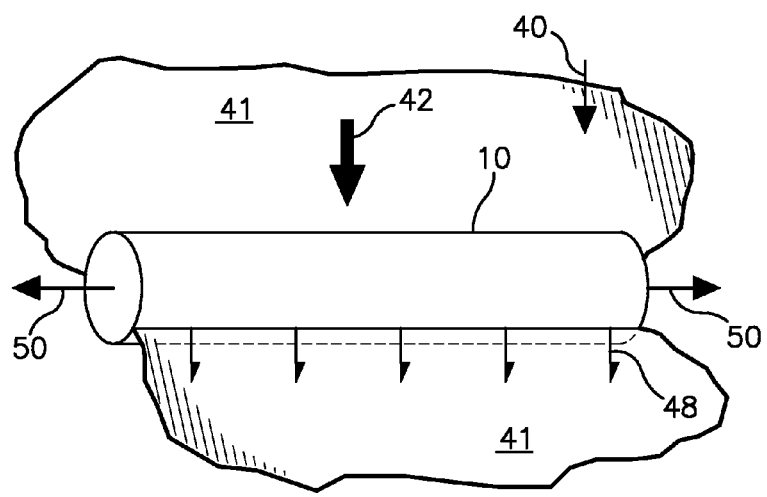
FIG. 5A is a top plan view of a storm-water redistribution device depicting redistribution of an originating flow in accordance with an embodiment of the invention.
Figure 5B:
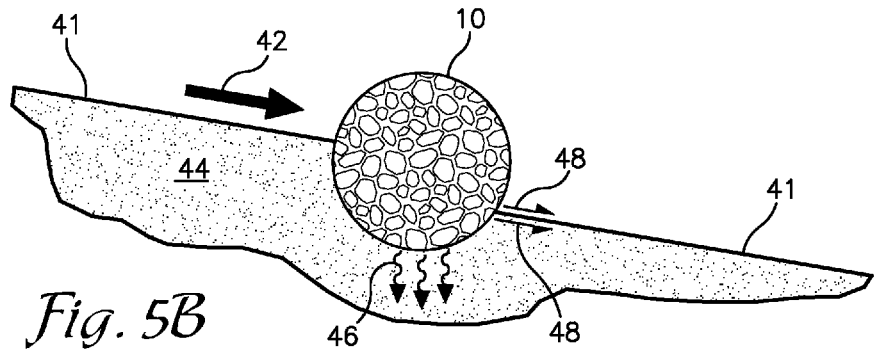
FIG. 5B is an end elevational view of the storm-water redistribution device of FIG. 5A depicting redistribution of an originating flow in accordance with an embodiment of the invention.

With reference now to FIGS. 5A and 5B, operation of the device 10 is described in accordance with an embodiment of the invention. The device 10 is configured for installation generally perpendicular to an overall downward slope depicted, by an arrow 40, of a surface 41. The downward slope 40 causes storm water to form an originating flow, depicted by an arrow 42, flowing in the direction of the downward slope 40. The originating flow 42 can be dispersed across the surface 41 to be intercepted by the device 10 evenly along its length or characteristics of the surface 41, such as gullies, valleys, debris, curbing, or other natural or man-made features may concentrate the flow along smaller sections of the length of the device 10.

The originating flow 42 is intercepted by the device 10 and infiltrates into the device 10 through the sidewall 16 thereof. Impact with and infiltration through the sidewall 16 may provide some headloss to the flow. The flow next impacts the particulate materials 14 disposed in the enclosure 12 which further obstruct flow of the fluid in the downslope direction 40. The particulate materials 14 thus further reduce the flow velocity and direct the fluid toward one or more flow types— types 1, 2, or 3.

Type 1 flow comprises generally vertical flow of the fluid toward the surface and includes infiltration of the fluid into the subsurface 44, as depicted in FIG. 5B by squiggled arrows 46. Type 2 flow comprises transverse flow that may be overland flow, e.g. flow of the fluid along the top of the surface 41, or subsurface flow that infiltrates into the subsurface 44 and is depicted by single-headed arrows 48. The type 2 flow produced by the device 10 is preferably of such reduced velocity to be sufficiently further slowed by the surface 41 and groundcover thereon to transform into type 1 flow and infiltrate into the subsurface 44. Type 3 flow comprises flow interior to the device 10 and generally parallel to the length thereof; type 3 flow is depicted in the figures by closed-head arrows 50. Preferably, type 3 flow exists within the device 10 but is sufficiently slowed by the particulate materials 14 therein to transform the type 3 flow into type 1 or type 2 flow before exiting the device 10. However, some fluid may exit the end walls 18 of the device 10 as type 3 flow as shown by the arrows 50. Type 3 flow exiting the end walls 18 may flow onto the surface 41 as overland flow, infiltrate into the subsurface 44, or flow into a subsequent device 10 as described below.

Figures 6A, 6B:
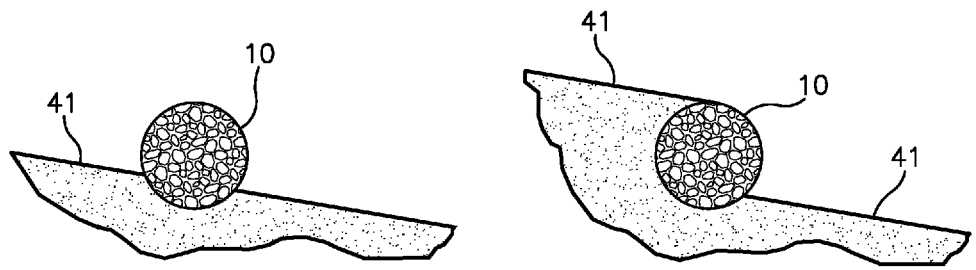
FIGS. 6A-E are schematic end elevational views of various exemplary installation configurations of storm-water redistribution devices depicted in accordance with embodiments of the invention.
Figures 6C, 6D:
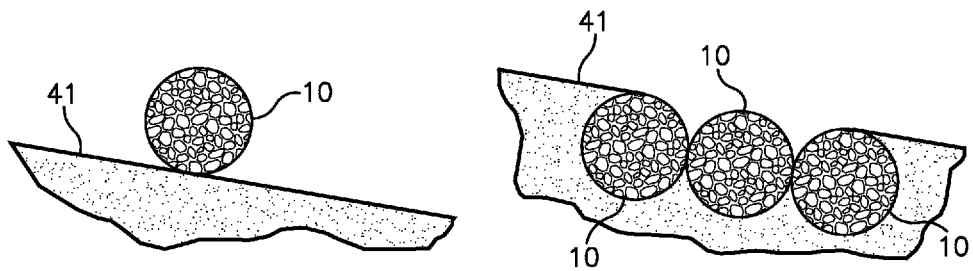
Figure 6E:
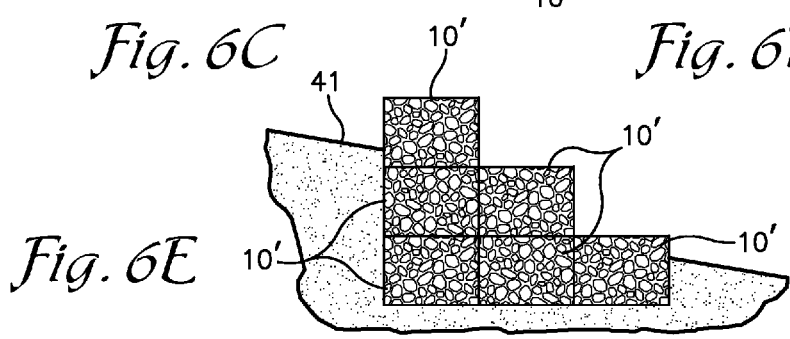

The device 10 can be disposed or installed on the surface 41 in a variety of configurations for permanent or temporary use. As depicted in FIGS. 6A-E, the device 10 can be at least partially sunken into the surface 41 (FIG. 6A); backfilled so as to position an upslope portion of the surface 41 at an elevation substantially even with a top portion of the device 10 and a downslope portion substantially even with a bottom of the device 10 (FIG. 6B); or placed directly on top of the surface 41 (FIG. 6C). A plurality of the devices 10 might also be provided and arranged in side-by-side rows and/or stacked as depicted in FIGS. 6D and 6E. Such multiple-device installations can employ any of the positioning techniques depicted in FIGS. 6A-C among other configurations. Devices 10 of various cross-sectional configurations might also be used to aid positioning of the devices 10, as shown by the use of square cross-sectional-shaped devices 10' in FIG. 6E. Although, a variety of exemplary installation configurations are depicted and described herein, such is not intended to limit embodiments of the invention. Any of a variety of other installations might be employed and are understood as falling within the scope of embodiments of the invention described herein.

The devices 10 are preferably of sufficient weight to resist displacement caused by interception of the originating flow 42 when installed in any of the configurations depicted in FIGS. 6A-E. However, the device 10 may be anchored to the surface 41 by any means available in the art including, for example and not limitation, stakes, tethers, anchors, or the like. In multiple device installations the devices 10 may be attached to one another by one or more fasteners, threads, ties, zip-ties, staples, welds, or the like.

Figure 7C:
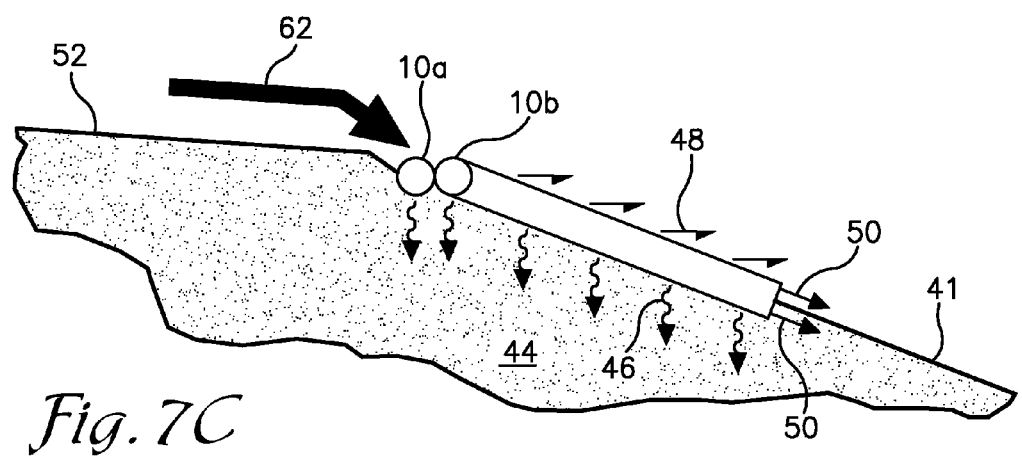
FIG. 7C is a cross-sectional side view of the installation of storm-water redistribution devices of FIG. 7A taken along the line 7C-7C.

Referring now to FIGS. 7A-C, an installation of the device 10 for control of storm-water runoff from a concentrated originating flow 62 produced by a parking lot 52 is described in accordance with an embodiment of the invention. An exemplary parking lot 52 having a curb 54 is described herein, but embodiments of the invention can be applied to any of a variety of similar flow-concentrating, impervious or semi-pervious, man-made or natural structures or surfaces without departing from the scope of embodiments of the invention described herein. The parking lot 52 has an overall downward slope depicted by arrow 56 that forms a flow of runoff 58 of storm-water that falls on the parking lot 52. The runoff 58 is diverted by the curb 54 toward an outlet 60 and thus forms a concentrated originating flow depicted by an arrow 62 that is directed by the outlet 60 toward an installation 64 of the device 10.

The installation 64 comprises one or more devices 10 disposed perpendicular to the slope 56 of the parking lot 52 and the outlet 60 to intercept the concentrated originating flow 62 therefrom. The installation 64 can be placed to abut the outlet 60, adjacent the outlet 60, or a distance downslope from the outlet 60. As depicted in FIG. 7A, the installation includes a pair of the devices 10 disposed side-by-side in a slightly arched or V-shaped arrangement in which the apex of the arch or V is aligned with the outlet 60. Although, two devices 10 are shown and described, other configurations are available. For example, a plurality of the devices 10 can be disposed end-to-end to form substantially the same configuration; the ends of such devices 10 can be coupled together by any available means, e.g. zip-ties, staples, stakes, threading, sewing, adhesives, welding, or the like or may remain uncoupled. Or multiple devices 10 can be stacked and/or laid side-by-side to provide a larger barrier for interception and diversion of the concentrated originating flow 62 as is necessary for particular site conditions.

The devices 10 depicted in FIG. 7A include a plurality of internal transverse partitions 20 disposed along the length thereof. The partitions 20 aid to retain the particulate materials 14 in the device 10 in desired locations during manufacturing, transport to an installation site, and installation of the device 10. The partitions 20 also retain the particulate materials 14 against movement that might result from flow of fluids through the device and gravity urging the materials 14 to move downslope.

In operation, as shown if FIGS. 7A-C, the concentrated originating flow 62 is received and intercepted by the sidewall 16 of the device 10a located on the upslope side of the installation 64. As described with respect to FIGS. 5A-B, the concentrated originating flow 62 infiltrates into the device 10a to form an internal flow that contacts the particulate materials 14 therein. Sediments, particulates, and other materials carried by the originating flow 62 are preferably substantially filtered out of the fluid by the enclosure 12 before infiltrating into the interior of the device 10a. Such filtration aids to prevent or reduce sedimentation within the device 10 that would reduce the effectiveness of the particulate materials 14 in slowing the internal flow and reduce the operating life of the device 10a.

Within the device 10a, the particulate materials 14 slow the internal flow velocity and divert the internal flow into type 1, type 2, and type 3 flows. The fluid is thus diverted into type 1 flow vertically downward to infiltrate into the subsurface 44 (as shown in FIG. 7B by arrows 46), along the length of the device 10a as type 3 flow (as depicted by arrows 50), and as type 2 flow to exit the opposite sidewall 16 of the device 10a and to enter into a second device 10b located downslope from the device 10a or to infiltrate into the subsurface 44. The flow of fluid entering the second device 10b is similarly diverted into type 1, 2, or 3 flows and is provided with further reduction in velocity thereof.

Fluid exiting the second device 10b as type 2 flow (shown by arrows 48) may flow over the surface 41 as overland flow which is preferably further slowed by the surface 41, such as by vegetated cover thereon, to transform to type 1 flow and infiltrate into the subsurface 44. The fluid exiting the second device 10b as type 2 flow may also or alternatively infiltrate into the subsurface 44. Type 2 flow leaving the second device 10b but not being further sufficiently slowed to transform to type 1 flow may eventually reach and combine with a stream, river, pond, or other body of water. Preferably, such residual flow is sufficiently decreased in both volume and velocity to have a negligible or greatly reduced impact on the receiving body of water. The decrease in velocity also aids to reduce or eliminate contaminate particles carried by the overland flow and thus reduces introduction of such contaminates to the receiving body of water.

The length of the devices 10a-b are preferably configured to provide sufficient headloss and dispersion of the concentrated originating flow 62 that type 3 flow from the end walls 18 (shown by arrows 50) of the devices 10a-b is negligible or is of such reduced volume and velocity as to be non-deleterious overland flow. However, if the volume or velocity of the resulting type 3 flow is too great, subsequent installations 66, 68, 70 may be provided.

As shown in phantom lines in FIG. 7A, a subsequent installation 66 of the device 10 can be provided to intercept the type 3 flow leaving the end walls 18 of the devices 10a-b and to further divert the flow downslope in a manner similar to that described above. The installation 66 can abut the end walls 18 so as to receive the type 3 flow directly. A subsequent installation 68 might also be provided spaced apart and downslope from the primary installation 64 so as to intercept type 3 and/or type 2 flows leaving the installation 64 as well as any additional flow produced by storm waters on the surrounding surface 72. Spacing of the subsequent installation 68 from the primary installation 64 may allow the surface and groundcover thereon to at least partially slow and/or absorb a portion of the fluid before reaching the subsequent installation 68. Further installations 70 can be provided as needed downslope from the installations 64 and 68 to similarly receive flows therefrom.

Figure 8A:
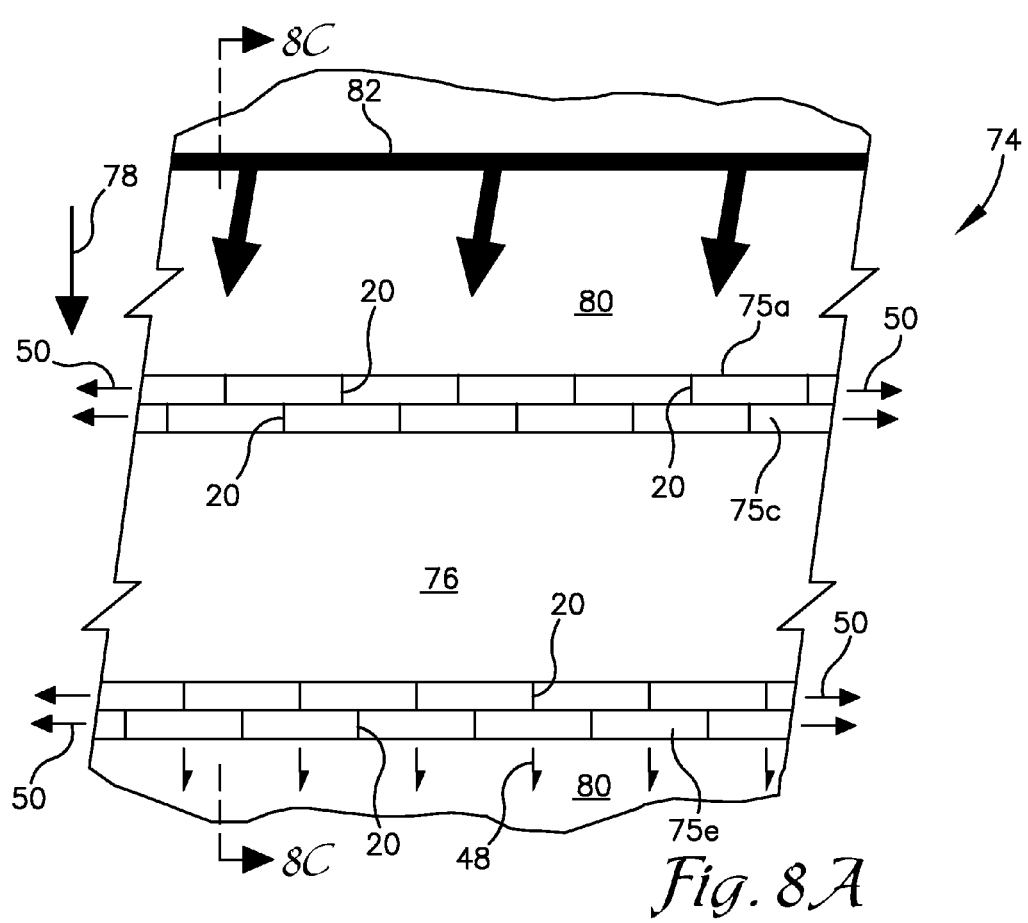
FIG. 8A is a schematic top plan view of an installation of storm-water redistribution devices along a trail depicted in accordance with an embodiment of the invention.

With reference to FIGS. 8A-C, an installation 74 of a plurality of devices 75 associated with a trail 76, such as a walking path in a stream buffer or linear park is described in accordance with an embodiment of the invention. The devices 75 are identical to the device 10 but are provided with a different reference numeral for sake of clarity. As depicted in FIGS. 8A-C the trail 76 is disposed on, and perpendicular to an overall downward slope (depicted by an arrow 78) of a surface 80. During storm conditions the slope 78 forms an originating flow 82 that may be concentrated by features or characteristics of the surface 80 or may be generally broadly distributed along the surface 80 to intersect the trail 76 at discrete points or generally along its length, respectively.

The trail 76 is configured for vehicular and/or foot traffic, among other forms of traffic, e.g. equestrian. The trail 76 can be constructed with any desired form of traffic surface, such as asphalt, concrete, gravel, cinders, dirt, recycled rubber, wood, or the like. The trail 76 is constructed on a foundation or bed 84 formed by a plurality of the devices 75. The bed 84 extends the entire length of the trail 76 or only portions thereof, such as only in areas of excess storm water or concentrated originating flow 82. The bed 84 is comprised of a plurality of the devices 75 laid side-by-side and in one or more stacked layers which may be vertically aligned or offset. One or more of the devices 75 are exposed on an upslope side of the trail 76 to intercept the originating flow 82 before the flow 82 reaches the trail 76. At least one device 75 is exposed along the downslope side of the trail 76 to enable type 2 overland flow to exit therefrom. The side-by-side placement of the devices 75 provides a continuous path through the devices 75 for the flow 82 from the upslope side, under the trail 76, and out of the installation 74 onto the surface 80 or into the subsurface 44 on the downslope side of the trial 76.

Although the devices are described as being exposed along the upslope or downslope sides of the installation, such is not intended to restrict embodiments of the invention to installations in which the devices 75 are visually exposed; the exposure described herein is to be understood as exposure to the originating flow 82 and to a downslope outlet therefor. For example, the upslope and downslope devices 75 might be overlain with one or more grates, particulate materials, or other objects or materials to provide a more aesthetic appearance.

A variety of design considerations might be considered in construction and placement of the installation 74. For example, shallower slopes are generally known to produce slower, deeper flows, while steeper slopes produce faster, shallower flows. As such, the slope 78 is preferably sufficiently shallow to produce a flow rate of the originating flow 82 that is slow enough to allow infiltration of the flow 82 into the device 75 without excessive pooling on the upslope side of the installation 74. The slope 78 is also preferably sufficiently steep to prevent the originating flow 82 from reaching a depth at which the originating flow 82 will overtop the installation 74. However, in embodiments, the installation 74 can be constructed to provide for pooling of the flow 82 and to allow additional time for the flow 82 to infiltrate into the devices 75.

Upon interception of the originating flow 82 by a first device 75a, the flow 82 is dispersed within the intercepting device 75a into type 1, type 2, or type 3 flows as described previously above. Type 1 flow from the first device 75a is directed vertically downward into one or more underlying device 75b and at least a portion thereof eventually infiltrates into the subsurface 44. Type 2 flow from the first device 75a is directed into one or more laterally adjacent devices 75c located downslope therefrom. The type 1 and type 2 flows from the first device 75a are similarly diverted through subsequent underlying and adjacent devices 75d until reaching and infiltrating into the subsurface 44 as type 1 flow (shown by arrows 46) or until reaching a final downslope device 75e from which any remaining flow may exit as type 2 flow onto the surface 80 as overland flow or into the subsurface 44 as shown by arrows 48.

Type 3 flow produced by the first device 75a is directed parallel to the trail 76 until being sufficiently slowed to transform to type 1 or type 2 flow at which point it passes to the adjacent devices 75b or 75c as described above, or until exiting an end wall 18 of the device 75a (not shown in FIGS. 8A-C). Accordingly, the originating flow 82 can be intercepted, slowed, and dispersed along the length of the trail 76 by the installation 74 to reduce the erosive power of the flow 82. The installation 74 also aids to counteract deleterious effects caused by installing the trail 76 on the surface 80. Diversion of the flow 82 beneath the trail 76 further resists erosion and undermining of the trail 76, among other potential damage caused by the flow 82 of storm water.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A storm-water redistribution device, comprising:
   an elongate geotextile enclosure that includes a sidewall that forms a hollow interior space, the sidewall being configured to intercept a fluid flow that is directed substantially transverse to the direction of elongation of the enclosure, the fluid flow at least partially penetrating into the interior space through the sidewall to form an internal fluid flow;
   a first partition forming a longitudinally extending, tubular section within the interior space;
   a second partition disposed within the interior space and extending between opposing surfaces of the interior space and the first partition to divide the interior space into a plurality of sections; and
   one or more particulate materials disposed in each of the sections, the particulate materials at least partially diverting the internal fluid flow in one or more directions including generally vertically downward, the generally vertically downward flow at least partially exiting through the sidewall as subsurface infiltration.

2. The storm-water redistribution device of claim 1, wherein the second partition is disposed in a plane that is generally transverse to the length of the enclosure and the sections comprise segments that are arranged end-to-end longitudinally along the length of the enclosure.

3. The storm-water redistribution device of claim 1, wherein the partition extends in a generally longitudinal plane extending along the length of the enclosure and the sections comprise compartments that are arranged side-by-side transversely across the width of the enclosure.

4. The storm-water redistribution device of claim 1, wherein adjacent sections are filled with one or more particulate materials having one or more of a different grade or different type to induce a desired flow characteristic within the respective section.

5. The storm-water redistribution device of claim 1, wherein the internal fluid flow is diverted into one or more of a flow directed substantially transversely to the length of the enclosure and a flow directed substantially longitudinally along the length of the enclosure, the flow directed transversely including one or more of a flow directed generally vertically downward toward and infiltrating into a subsurface and a flow directed generally horizontally and exiting the enclosure as overland flow, and the flow directed longitudinally moving through the partition from a first of the plurality of sections to a second of the plurality of sections.

6. The storm-water redistribution device of claim 1, wherein at least partially diverting the internal fluid flow by the one or more particulate materials produces headloss in the internal fluid flow.

7. The storm-water redistribution device of claim 1, wherein the geotextile enclosure at least partially filters the fluid flow.

8. The storm-water redistribution device of claim 1, wherein the geotextile enclosure comprises one or more of a mesh, a netting, a fabric, a perforated sheet, and a felt.

9. The storm-water redistribution device of claim 1, wherein the particulate materials comprise uniformly graded particles, well graded particles, or gap-graded particles.

10. The storm-water redistribution device of claim 1, wherein the one or more particulate materials in the respective sections are retained by the partition against movement of the particulate materials caused by interaction with the internal fluid flow and gravity.

11. The storm-water redistribution device of claim 1, wherein the partition is comprised of the same or a different material than the enclosure.

12. The storm-water redistribution device of claim 1, wherein a material comprising the partition and the particulate material disposed in the sections formed thereby are selected to provide a predetermined flow direction or a predetermined headloss.

13. A storm-water redistribution installation comprising:
   an elongate storm-water redistribution device disposed on a surface having a slope, the device being positioned to extend substantially perpendicular to the slope and to receive an originating fluid flow along a sidewall of the device, the device including
   the sidewall formed from a geotextile material that forms an enclosure with a hollow interior,
   a first partition disposed in the interior to extend transversely across the interior to divide the interior into a plurality of sections arranged end-to-end along the length of the device,
   a second partition forming a longitudinally extending, tubular section,
   a third partition that extends between opposing surfaces of the interior of the enclosure and the second partition, and
   a particulate material disposed in one or more of the plurality of sections and retained against longitudinal movement within the device by the first partition, the device being configured to enable penetration of the originating fluid flow through the sidewall to form an internal fluid flow, a velocity of the internal fluid flow being reduced by contact of the internal fluid flow with the particulate material, and at least a portion of the internal fluid flow being directed generally vertically downward to exit through the sidewall as subsurface infiltration.

14. The storm-water redistribution installation of claim 13, further comprising a second device configured substantially similarly to the storm-water redistribution device and disposed alongside the storm-water redistribution device, the second device receiving a flow of fluid exiting the sidewall of the storm-water redistribution device.

15. The storm-water redistribution installation of claim 13, further comprising a second device configured substantially similarly to the storm-water redistribution device and disposed substantially perpendicular to and adjacent or abutting an end of the storm-water redistribution device and receiving a fluid flow exiting the end of the storm-water redistribution device.

16. The storm-water redistribution installation of claim 13, wherein the storm-water redistribution device is positioned downslope from an impervious structure and to receive a concentrated fluid flow from the impervious structure.

17. The storm-water redistribution installation of claim 13, wherein the storm-water redistribution device is disposed to extend in a substantially V-shaped orientation having an apex of the V-shape aligned with a source of the originating flow and first and second arms of the V-shape extending at least partially downslope.

18. A storm-water redistribution installation comprising:
a bed formed from a plurality of elongate storm-water redistribution devices disposed side-by-side on a surface having a slope, the devices being positioned to extend substantially perpendicular to the slope and to receive an originating fluid flow along an upslope side of the bed, each of the devices including
a sidewall formed from a geotextile material that forms an enclosure with a hollow interior,
a partition disposed in the interior to divide the interior into a plurality of sections, and
a particulate material disposed in one or more of the plurality of sections, the partition retaining a position of the particulate material relative to the device,
each of the devices being configured to enable infiltration of a fluid flow through the sidewall to form an internal fluid flow, a velocity of the internal fluid flow being reduced by contact of the internal fluid flow with the particulate material; and
a traffic surface disposed to overlie at least a portion of the bed, the bed diverting the originating fluid flow longitudinally along the length of the bed and transversely beneath the traffic surface to at least partially exit the bed on a downslope side as one or more of overland or subsurface flow having a velocity less than that of the originating flow, wherein the traffic surface comprises a trail and the installation is located in one or more of a stream buffer and a linear park.

19. The storm-water redistribution installation of claim 18, wherein at least a portion of the fluid in the originating flow is diverted into a subsurface underlying the bed.

20. The storm-water redistribution device of claim 18, further comprising an inner partition forming a longitudinally extending, tubular section, and wherein the partition extends inward from the opposing surfaces of the interior space of the enclosure to respective opposing sides of the inner partition.

* * * * *